US008369357B2

(12) United States Patent
Iyer et al.

(10) Patent No.: US 8,369,357 B2
(45) Date of Patent: Feb. 5, 2013

(54) SYSTEM AND METHOD FOR PROVIDING SIMULTANEOUS HANDLING OF LAYER-2 AND LAYER-3 MOBILITY IN AN INTERNET PROTOCOL NETWORK ENVIRONMENT

(75) Inventors: Jayaraman R. Iyer, Sunnyvale, CA (US); Anand K. Oswal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1315 days.

(21) Appl. No.: 11/365,310

(22) Filed: Feb. 28, 2006

(65) Prior Publication Data

US 2007/0201469 A1    Aug. 30, 2007

(51) Int. Cl.
*H04J 3/16* (2006.01)
(52) U.S. Cl. ........ 370/469; 370/310; 370/464; 370/466; 370/467; 455/432.2
(58) Field of Classification Search .................. 370/310, 370/464–469; 455/432.2
See application file for complete search history.

(56) References Cited

U.S. PATENT DOCUMENTS

| | | | |
|---|---|---|---|
| 6,452,920 B1 * | 9/2002 | Comstock | 370/349 |
| 6,466,964 B1 * | 10/2002 | Leung et al. | 709/202 |
| 6,615,263 B2 | 9/2003 | Dulai et al. | 709/225 |
| 6,621,820 B1 | 9/2003 | Williams et al. | 370/395.31 |
| 6,684,256 B1 | 1/2004 | Warrier et al. | 709/238 |
| 6,708,225 B1 | 3/2004 | Cho et al. | 709/317 |
| 6,728,884 B1 | 4/2004 | Lim | 713/201 |
| 6,742,036 B1 | 5/2004 | Das et al. | 709/226 |
| 6,760,444 B1 | 7/2004 | Leung | 380/270 |
| 6,771,623 B2 | 8/2004 | Ton | 370/331 |
| 6,785,256 B2 | 8/2004 | O'Neill | 370/338 |
| 6,826,173 B1 | 11/2004 | Kung et al. | 370/352 |
| 6,829,709 B1 | 12/2004 | Acharya et al. | 713/160 |
| 6,839,338 B1 | 1/2005 | Amara et al. | 370/338 |
| 6,889,321 B1 | 5/2005 | Kung et al. | 713/153 |
| 6,907,501 B2 | 6/2005 | Tariq et al. | 711/118 |
| 6,915,345 B1 | 7/2005 | Tummala et al. | 709/225 |
| 6,920,503 B1 | 7/2005 | Nanji et al. | 709/230 |
| 6,922,404 B1 | 7/2005 | Narayanan et al. | 370/338 |
| 6,947,401 B2 | 9/2005 | El-Malki et al. | 370/331 |
| 6,978,128 B1 | 12/2005 | Raman et al. | 455/414 |
| 6,980,802 B2 | 12/2005 | Jung | 455/436 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,024,687 B2 | 4/2006 | Chaudhuri et al. | 726/3 |
| 7,477,894 B1 * | 1/2009 | Sinha | 455/432.1 |

(Continued)

OTHER PUBLICATIONS

Draft—TR45—PN-3-4732-RV4 (to be published as TIA-835.1-D), 32 pages.

(Continued)

*Primary Examiner* — Olumide T Ajibade Akonai
*Assistant Examiner* — Jaime Holliday
(74) *Attorney, Agent, or Firm* — Baker Botts L.L.P.

(57) ABSTRACT

An apparatus for providing mobility in an Internet protocol (IP) network environment is provided that includes a cell site element operable to receive an address resolution protocol (ARP) signal from a base station. The ARP signal is associated with a selected mobile station that can roam between networks. In response to the signal, the cell site element evaluates a table that identifies a plurality of mobile stations and if the selected mobile station is not present in the table, then a mobility registration request is generated and communicated to a next destination.

26 Claims, 2 Drawing Sheets

U.S. PATENT DOCUMENTS

| | | | |
|---|---|---|---|
| 7,505,434 B1 * | 3/2009 | Backes | 370/331 |
| 2003/0217165 A1 | 11/2003 | Buch et al. | 709/229 |
| 2003/0219000 A1 * | 11/2003 | Magret | 370/338 |
| 2004/0114559 A1 * | 6/2004 | Wang | 370/338 |
| 2004/0190477 A1 * | 9/2004 | Olson et al. | 370/338 |
| 2007/0091804 A1 * | 4/2007 | Pan et al. | 370/230 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 121 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 259 pages, Mar. 2006.

3GPP2 C.S0024-A, 3rd Generation Partnership Project 2 '3GPP2', "cdma2000 High Rate Packet Data Air Interface Specification," Version 2.0, 1,277 pages, Jul. 2005.

B. Aboba, et al., "Extensible Authentication Protocol (EAP)," Network Workikng Group, RFC 3748, http://www.ietf.org/rfc/rfc3748.txt, 59 pages, May 19, 2006.

B. Aboba, D. Simon, "PPP EAP TLS Authentication Protocol," Network Working Group, RFC 2716, http://www.ietf.org/rfc/rfc2716.txt, 22 pages, May 19, 2006.

W. Simpson, "PPP Challenge Handshake Authentication Protocol (CHAP)," Network Working Group, RFC 1994, http://www.ietf.org/rfc/rfc1994.txt, 12 pages, May 19, 2006.

W. Simpson, "The Point-to-Point (PPP)," Network Working Group, RFC 1661, http://www.ietf.org/rfc/rfc1661.txt, 47 pages, May 19, 2006.

P. Eronen, et al., "Diameter Extensible Authentication Protocol (EAP) Application," Network Working Group, RFC 4072, http://www.ietf.org/rfc/rfc4072.txt, 29 pages, May 19, 2006.

P. Calhoun, et al., "Diameter Base Protocol," Network Working Group, RFC 3588, http://www.ietf.org/rfc/rfc3588.txt, 129 pages, May 19, 2006.

* cited by examiner

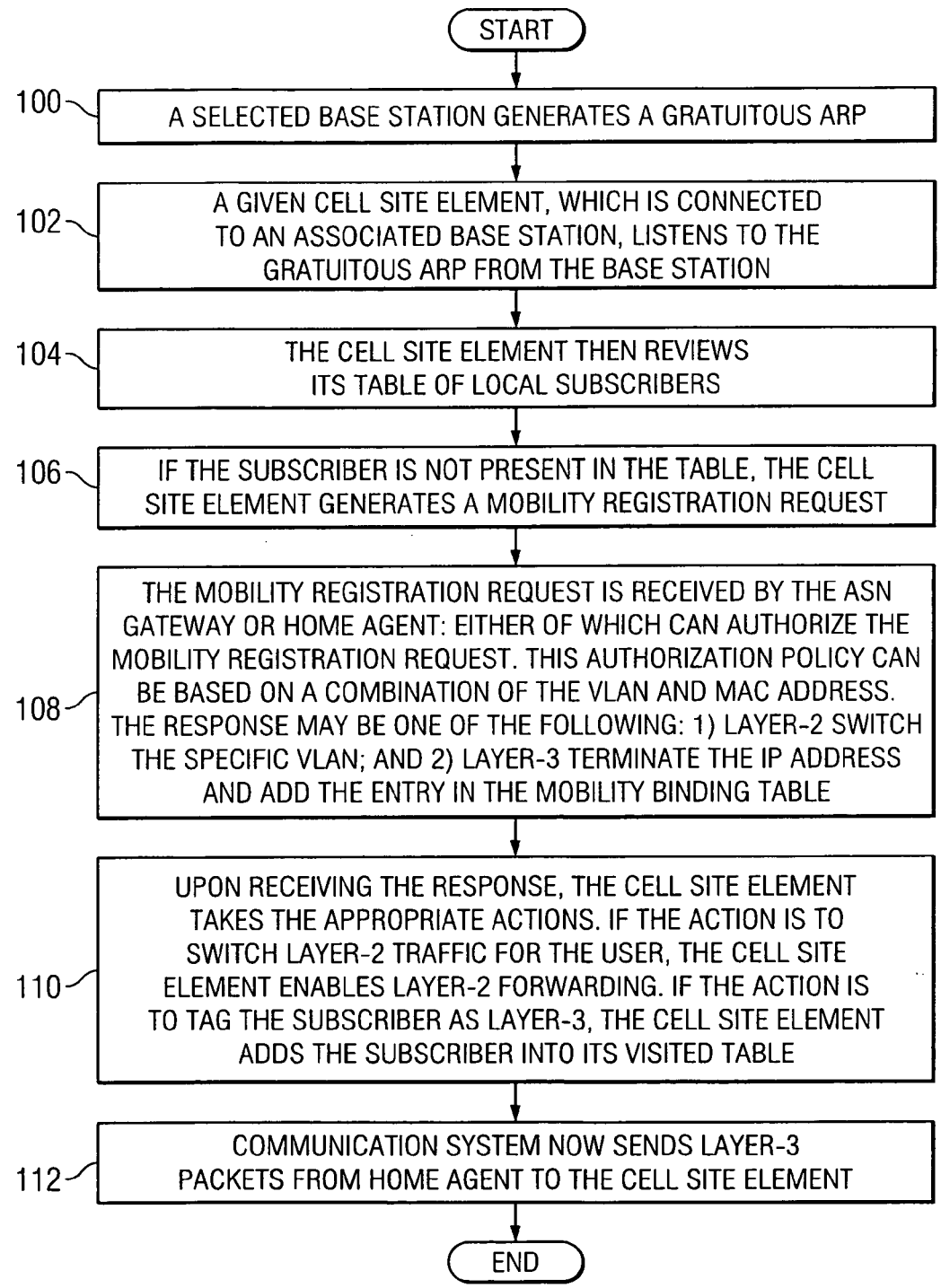

SYSTEM AND METHOD FOR PROVIDING SIMULTANEOUS HANDLING OF LAYER-2 AND LAYER-3 MOBILITY IN AN INTERNET PROTOCOL NETWORK ENVIRONMENT

TECHNICAL FIELD OF THE INVENTION

This invention relates in general to the field of network communications and, more particularly, to a system and method for providing mobility in an Internet protocol network environment.

BACKGROUND OF THE INVENTION

Network architectures may be configured in order to provide simple Internet protocol (IP) and mobile IP-based packet services to any number of network components, such as a mobile station, for example. A mobile station is generally assigned an IP address that may be a static address or a dynamically assigned address from a pool of addresses. An end user of a mobile station may then register for services and roam within or beyond wireless boundaries while still maintaining the always-on and always-reachable service status.

This mobility feature offers opportunities for entities to provide Internet services, intranet services, or various other services to a mobile station. However, there are some problems associated with mobility in the context of layer-2 and layer-3 networks. As the end user base grows in number and as these end users grow in sophistication (e.g. in terms of mobility and/or in the services requested), communication systems should be developed to optimally accommodate these end users. Performance and compatibility are two eminent concerns for any person who is relegated the difficult task of accounting for a large number of diverse end users.

Accordingly, the ability to provide a communications system that consumes few resources, optimizes bandwidth, and achieves superior performance across layer-2 and layer-3 configurations presents a significant challenge for network operators, service providers, and system administrators.

SUMMARY OF THE INVENTION

From the foregoing, it may be appreciated by those skilled in the art that a need has arisen for an improved mobility capability for end users in an Internet protocol (IP) network environment. In accordance with one embodiment of the present invention, a system and a method for offering mobility across multiple network layers is provided that overcomes the disadvantages of previous network arrangements.

In accordance with one embodiment of the present invention, an apparatus for providing mobility in an Internet protocol (IP) network environment is provided that includes a cell site element operable to receive an address resolution protocol (ARP) signal from a base station. The ARP signal is associated with a selected mobile station that can roam between networks. In response to the signal, the cell site element evaluates a table that identifies a plurality of mobile stations and if the selected mobile station is not present in the table, then a mobility registration request is generated and communicated to a next destination.

In more specific embodiments, the mobility registration request is generated by using a WiMax protocol, a proxy mobile IP protocol, a GPRS tunneling protocol (GTP), other mobility protocols, or a wireless LAN context communication protocol (WLCCP) protocol. In yet other embodiments, the mobility registration request identifies a VLAN on which the ARP signal was received and a MAC address associated with a request for the selected mobile station. The authorization can be based on a combination of the VLAN and the MAC address.

In still other embodiments, the cell site element is further operable to respond to the request by layer-2 switching a specific VLAN or by layer-3 terminating an IP address and adding an entry to the table. The cell site element can also respond to the request by implementing a redirection policy, by mapping the selected mobile station to a VPN routing and forwarding (VRF) element or to a VLAN, or by applying a pseudo-wire. The cell site element is also operable to tag the selected mobile station as layer-3 and to add the selected mobile station to a visited table component.

Certain embodiments of the present invention may provide a number of technical advantages. For example, according to one embodiment of the present invention, a data communications approach is provided that presents an optimal solution in combining a layer-2 network with the scaling properties of a layer-3 solution. ARP-triggered mechanisms can be leveraged to generate proxy mobility registrations. This solution does not change the existing layer-2 base-stations and, further, offers an easy insertion strategy for any network operator or system administrator.

Additionally, by combining the layer-2 benefits with layer-3 forwarding, the present invention allows better scaling for the configuration. Moreover, the proposed solution does not rely on a client mobile IP and, therefore, can work much faster in reacting to mobility changes. Generally, a client mobile IP solution typically needs to listen to the foreign agent (FA) advertisement, and then the OS stack needs to trigger the MIP registration. In addition, a client-based scheme needs management of the end-devices and has taxing issues in working with NAT. Finally, the solution allows for an easy migration to 802.16e based WiMax architecture.

Certain embodiments of the present invention may enjoy some, all, or none of these advantages. Other technical advantages may be readily apparent to those skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified flowchart illustrating an example flow for providing optimal mobility to an end user of a mobile station.

DETAILED DESCRIPTION OF THE INVENTION

Figure 1:
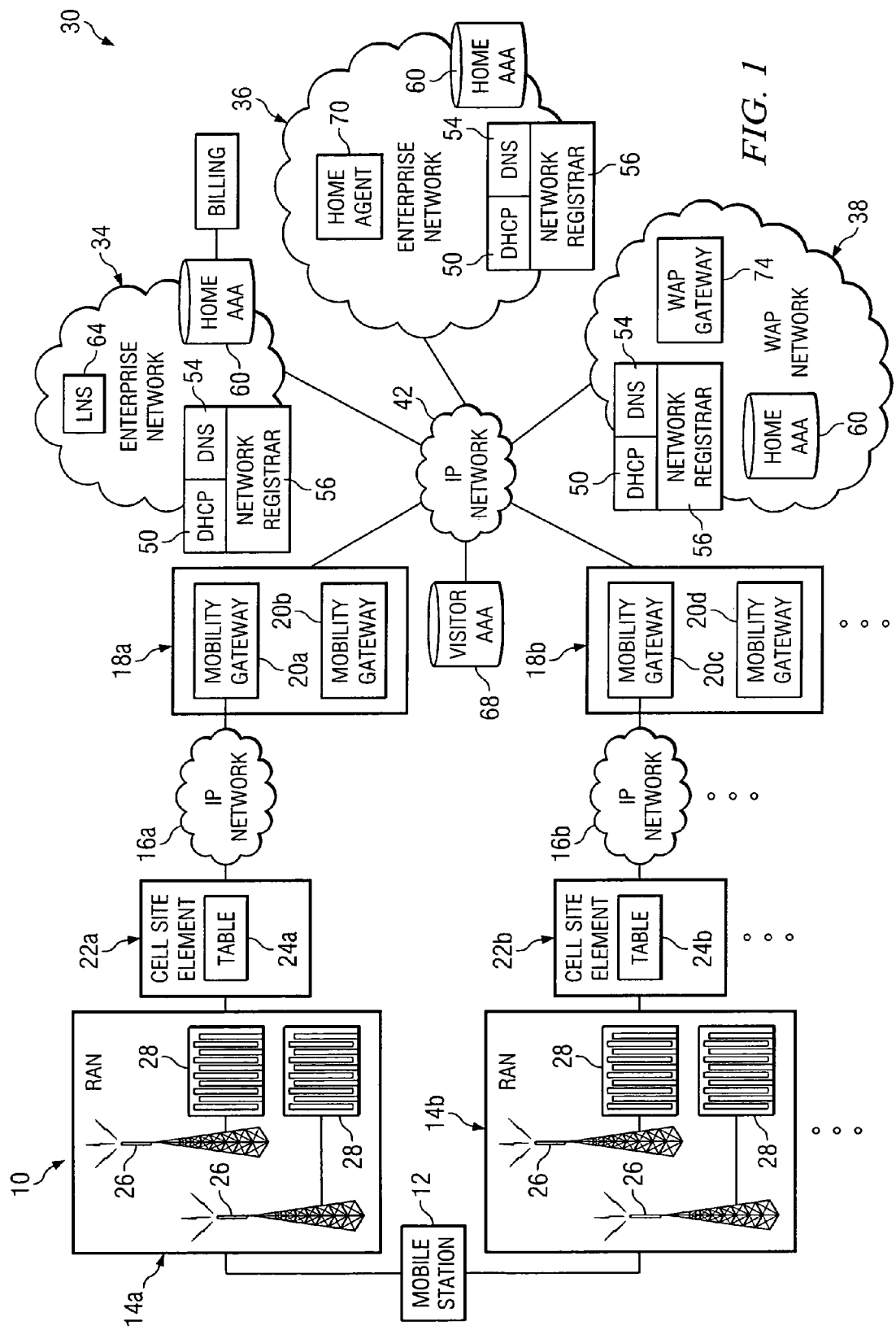
FIG. 1 is a simplified block diagram of a communication system for enabling mobility in an Internet protocol (IP) network.

FIG. 1 is a simplified block diagram of a communication system 10 for providing mobility in an Internet protocol (IP) network in accordance with one embodiment of the present invention. Communication system 10 includes a mobile station 12, multiple radio access networks (RANs) 14a and 14b, multiple IP networks 16a and 16b, multiple mobility gateway clusters 18a and 18b, and multiple cell site elements 22a and 22b, which each include a table 24a and 24b respectively. Communication system 10 also includes an IP communications network block 30, which comprises several sub-networks. The elements within communication system 10 cooperate in order to provide services to mobile station 12. In addition, the sub-networks may operate to provide updated IP addressing information and other associated parameters for communicating data accurately to an end user of mobile station 12.

In accordance with the teachings of the present invitation, communication system 10 offers a solution to combine a layer-2 network with the scaling capabilities of a layer-3 solution in a mobile environment. In particular, the architecture of communication system 10 uses a triggered mechanism to generate proxy mobility registrations.

Before proceeding further, for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Base stations are generally deployed as layer-2 devices. Large-scale flat layer-2 structures are prevalent in most networking architectures today. Such an architecture implicates numerous scalability issues such as managing excessively large MAC tables. In addition, other salient issues have surfaced that relate to security, broadcast storms, and other dilemmas that inhibit system performance. It should be also noted that current layer-2 solutions are simply not conducive to a WiMax architectural approach.

Communication system 10 addresses these issues, and others, by performing appropriate conversions of the layer-2 network into terms of layer-3 mobility. This solution would allow the network to scale better and it can provide an effective migration path to an 802.16e mobile network. In most network configurations, each base station/sector is connected to a switch port. Upon receiving a layer-2 radio link indication from a subscriber, base station 28 sends out a gratuitous signal so that tables 24a and 24b (e.g. MAC tables) in cell site elements 22a and 22b are updated.

In one embodiment, the signal is an address resolution protocol (ARP) message. The ARP protocol behaves as follows. The TCP/IP protocol is used to convert an IP address into a physical address, such as an Ethernet address for example. A host (wishing to obtain a physical address) broadcasts an ARP request onto the TCP/IP network. The host on the network that has the address in the request then replies with its physical hardware address.

Thus, the present invention leverages ARP-triggered mechanisms to generate proxy mobility registrations. Such a strategy provides numerous benefits and advantages. For example, this strategy does not change the existing layer-2 base-stations. The ARP triggering from the base-station may be replaced by an equivalent layer-2 mechanism notifying the presence of a mobile station at the cell site element. Moreover, this solution combines the layer-2 benefits with layer-3 forwarding and, hence, allows better scaling for the configuration.

Before proceeding further, the components of FIG. 1 are thoroughly described for purposes of completeness and coherence. Mobile station 12 is a communications interface between an end user and multiple IP networks 16a and 16b. Mobile station 12 may be a cellular (or wireless) telephone, a computer, a personal digital assistant (PDA), a laptop or electronic notebook, or any other device, component, or object capable of initiating voice or data exchanges within communication system 10. In addition to executing radio or processing functions to access IP network 16a or 16b through a radio interface, mobile station 12 may also provide an interface to the human user, such as via a microphone, a display, a keyboard, or other terminal equipment (such as an interface to a personal computer or to a facsimile machine in cases where mobile station 12 is used as a modem for example, etc.). An end user as referred to in this document generally represents a person wishing to initiate a data exchange within communication system 10. However, the end user may alternatively be a cellular component, a computer, a program, a database, or any other device, element, or object capable of initiating a voice or a data exchange within communication system 10. Mobile station 12 is coupled to one or more RANs 14a and 14b.

RANs 14a and 14b each comprise a base transceiver station 26 and a base station 28. RANs 14a and 14b offer an interface between mobile station 12 and IP networks 16a and 16b. This interface allows data to be exchanged between mobile station 12 and any number of selected elements within communication system 10. Data, as used herein in this document, refers to any type of numeric, voice, video, or script data, or any other suitable information in any appropriate format that may be communicated from one point to another.

Cell site elements 22a and 22b are routers in one embodiment, but alternatively could be bridges, gateways, switches, or any other suitable component that is operable to achieve the functionalities of cell site elements 22a and 22b, as described herein. Cell site elements 22a and 22b may include capabilities for accounting for the proxy mobile IP client, as well as foreign agent functionalities. Cell site elements 22a and 22b help mobile station 12 migrate from a layer 2 network to a layer 3 network by transmitting an appropriate mobility request. Note that minimal upgrades are necessary for implementing the present invention, as only the cell site elements 22a and 22b would have to be enhanced in order to achieve most or all of the teachings of the present invention.

In one embodiment, the mobility component of cell site elements 22a and 22b are provided by software or a state machine: these components may be provided directly within cell site elements 22a and 22b or simply coupled thereto. In other embodiments, the mobility components are field programmable gate arrays (FPGAs). Alternatively, such operations and techniques may be executed by any suitable component, device, application specific integrated circuit (ASIC), processor, algorithm, erasable programmable read only memory (EPROM), electrically erasable programmable ROM (EEPROM), or any other suitable object that is operable to facilitate such operations. Considerable flexibility is provided by the structure of the mobility components. It can also be easily appreciated that such a function could be provided external to cell site elements 22a and 22b. In such cases, such a functionality could readily be embodied in a separate component, element, or device.

Base transceiver station 26 may include radio transmission/reception devices, components or objects, and antennas. Base transceiver station 26 may operate as a series of complex radio modems and may assist in performing suitable networking tasks. Base transceiver station 26 may also perform transcoding and rate adaptation functions where appropriate. Base transceiver station 26 may be coupled to a base station controller that uses a landline (such as a high speed T1/E1, for example) interface. Base station controller may also be provided within RANs 14a and 14b to operate as a management component for a radio interface. This management capability may be accomplished through remote commands to base transceiver station 26.

In operation, base transceiver stations 26 provide transmit and receive interface links for communication system 10. One or more base transceiver stations 26 receive information from mobile station 12 in the form of data packets and communicate the data packets or information to corresponding base station controllers. Base station controllers work in conjunction with base transceiver stations 26 to provide a link or interface between mobile station 12 and multiple IP networks 16a and 16b. Base station controllers may then communicate data packets or information received from base transceiver station 26 to a corresponding data network component within communication system 10.

Base station 28 represents a radio transmission and reception station for handling communications traffic. Base station 28 may also be identified as a cell site, primarily so because it may hold one or more transmit/receive cells. One or more base stations 28 may comprise one or more receive/transmit antennas, a base station controller, a microwave dish, and suitable associated electronic circuitry.

IP networks 16a and 16b each represent a series of points or nodes of interconnected communication paths for receiving and transmitting packets of information that propagate through communication system 10. IP networks 16a and 16b could be layer-2 or layer-3 networks, or other suitable configurations where appropriate. IP networks 16a and 16b offer a communications interface between RANs 14a and 14b and clusters 18a and 18b respectively. IP networks 16a and 16b may be any local area network (LAN), metropolitan area network (MAN), or wide area network (WAN), or any other appropriate architecture or system that facilitates communications in a network environment. IP networks 16a and 16b implement a TCP/IP communication language protocol in a particular embodiment of the present invention. However, IP networks 16a and 16b may alternatively implement any other suitable communication protocol for transmitting and receiving data packets within communication system 10.

Clusters 18a and 18b each comprise one or more mobility gateway elements 20a, 20b, 20c, and 20d that provide access to the Internet, intranets, wireless application protocol (WAP) servers, or any other suitable platform, element, or network for communication with mobile station 12. Clusters 18a and 18b may each provide (via mobility gateway elements 20a through 20d) an access gateway for both mobile station 12 and IP networks 16a and 16b. Clusters 18a and 18b may also provide a communications node between IP networks 16a and 16b (and further to mobile station 12) and the elements within the IP communications network block. Clusters 18a and 18b may also provide foreign agent support and packet transport for virtual private networking (both of which are discussed in greater detail below) or for any other suitable networking configuration where appropriate. Additionally, clusters 18a and 18b may operate to authenticate, authorize, and provide an accounting functionality for information propagating through communication system 10.

In another embodiment of the present invention, clusters 18a and 18b may be packet data serving nodes (PDSNs) or serving general packet radio service (GPRS) support nodes (SGSN), providing a communications medium in a GPRS service network environment. Where communication system 10 is implemented in a GPRS environment, a series of IP network gateways may be provided, each of which may include a gateway GPRS support node (GGSN) that works in conjunction with the SGSNs in communicating high-speed data exchanges within communication system 10.

GPRS represents a packet-based data bearer service for communication services that may be delivered as a network overlay for any type of suitable network configuration or platform. GPRS generally applies packet-radio and packet switching principles to transfer data packets in an efficient way between global system for mobile communications (GSM) mobile stations and external packet data networks. Packet switching occurs when data is split into packets that are transmitted separately and then reassembled at a receiving end. GPRS may support multiple Internet communication protocols, and may enable existing IP, X.25, or any other suitable applications or protocols to operate over GSM connections.

IP communications network block 30 includes a serving IP network 42 with a series of sub-networks, such as an enterprise network 34, an enterprise network 36, and a WAP network 38. These sub-networks (enterprise networks 34 and 36 and WAP network 38) cooperate with IP network 42 to retrieve accurate IP addressing information that identifies an end user in order to push data through clusters 18a and 18b and on to mobile station 12. Additionally, IP communications network block 30 operates generally to address the mobility features of mobile station 12 in providing consistent and accurate data flows that are pushed to mobile station 12.

IP network 42 represents a series of points or nodes of interconnected communication paths for receiving and transmitting packets of information that propagate through communication system 10. IP network 42 provides an interface between any selected one of enterprise network 34, enterprise network 36, and WAP network 38, and any selected one of clusters 18a and 18b and RANs 14a and 14b. IP network 42 may be any LAN, MAN, WAN, or any other appropriate architecture or system that facilitates communications in a network environment. IP network 42 may implement a TCP/IP communication language protocol or any other suitable communication protocol for transmitting and receiving data packets within communication system 10. IP network 42 operates to receive data that may be pushed from enterprise networks 34 and 36 and WAP network 38 to clusters 18a and 18b. The data or information may then be communicated or otherwise relayed to mobile station 12.

Referring back to IP communications network block 30, enterprise networks 34 and 36 and WAP network 38 generally represent home domains for an end user of mobile station 12. An end user of mobile station 12 may be generally homed in a particular domain that provides registration, billing, and other suitable services to the end user. Home domains could be entities such as Verizon, Sprint, AT&T, and other service providers that offer such services to one or more end users of mobile station 12. These home domains may also represent corporate domain environments, such as Cisco.com, Intel.com, or IBM.com, for example, which may include an internal domain for end users of one or more mobile stations 12 to register. Such home domains may be private or public, secure or unsecured, and may generally provide a location for data communications, storage, or retrieval.

Each of the sub-networks illustrated in IP communications network block 30 may also store user profiles and associated information of end users of mobile stations 12. In addition, each of the sub-networks may choose to provide different or combinational services to mobile station 12. For example, simple IP services or mobile IP services, or any combination thereof, may be provided to an end user of mobile station 12 by any one of enterprise networks 34 and 36, and WAP network 38. These services may, in certain instances, be dependent on the capabilities of mobile station 12.

Each of the sub-networks illustrated in IP communications network block 30 comprise a dynamic host configuration protocol server (DHCP) 50, a domain name system (DNS) database element 54, and a network registrar 56 that cooperate in order to address the dynamic addressing feature described above. In addition, enterprise networks 34 and 36, and WAP network 38 each include a home authentication, authorization, and accounting (AAA) server 60 that manages end user requests for access to computer resources and that provides authentication, authorization, and accounting services for a corresponding network or for an end user of mobile station 12.

In operation, one or more end users of one or more mobile stations 12 are assigned a network access identifier (NAI). DHCP server 50, DNS database element 54, and network registrar 56 operate to maintain a relationship in a database configuration that is constantly updated in which an NAI is associated with an IP address and/or other suitable parameters and identifies an end user of mobile station 12. In the case where an IP address or any other associated parameter changes, the changed information may be updated accordingly in DNS database element 54. DNS database element 54 also allows an application server or device to direct a query to the database (in the appropriate domain) and to retrieve a specific IP address or specific end user information or parameters that are allocated to the NAI associated with an end user of mobile station 12. After obtaining the particular address, information, or parameter, the application server or device may then properly push data to an end user of mobile station 12.

DHCP server 50 is a communications element that coordinates a communications session for mobile station 12 within communication system 10. DHCP server 50 receives a request to initiate a communications session, assigns a new address for a specific time period (commonly referred to as a lease period), and sends the new address to the requesting element together with the other required configuration information. When a requesting element, such as an end user of mobile station 12, needs to launch TCP/IP operations, it communicates a request for addressing information. Once the new address is assigned and the other required configuration information is received, this information is acknowledged by the end user and used to set up its corresponding configuration.

The DHCP protocol represents a platform that lets an operator, such as a network administrator for example, to centrally manage (and automate where appropriate) the assignment of IP addressing configurations within a network. Without the DHCP configuration, an IP address must be entered manually at each entity or system wishing to communicate in a network environment. DHCP also allows a network administrator to supervise and to distribute IP addresses from a central point. In a particular embodiment, DHCP server 50 provides the automatic (dynamic) allocation of IP client configurations for a predetermined period. DHCP server 50 generally does not reallocate the address during the lease period and may attempt to return the same address every time an end user requests an IP address. Additionally, DHCP server 50 may extend this period for the end user with subsequent requests, and may also send a message to a corresponding server before the time period expires, communicating that it no longer needs the address and thus the address may be released and assigned to another end user or client within the network.

DNS database element 54 operates to store an element that associates an NAI with an IP address or other suitable information of an end user of mobile station 12 according to one embodiment of the present invention. Alternatively, DNS database element 54 may store any identification tool, component, object, or element that operates to correlate, recognize, or otherwise associate an end user of mobile station 12 with some unique network identity for communicating data. DNS database element 54 may be updated periodically or in any suitable manner in order to reflect the current or otherwise the accurate IP address and corresponding additional information of an end user of mobile station 12. DNS database element 54 may be in constant communication with DHCP server 50 and network registrar 56 and be accessed, where appropriate, by IP network 42 in order to retrieve, or otherwise to identify, an IP address or other associated information for an end user. DNS database element 54 may provide not only accurate IP addressing information but other information or parameters of an end user of mobile station 12, for example, such as accounting, billing, priority, or how long the IP address will be available.

Accessing DNS database element 54 may be generally domain-dependent in a particular embodiment of the present invention. An application device or element or other communications interface sends communications through the home domain in order to access or to retrieve the corresponding IP address or other suitable information of an end user. Mobile station 12 may be continuously registering with any one or more of the sub-networks within IP communications network block 30 depending on its respective location or on any other suitable triggering event. Additionally, this IP address or other suitable information may be constantly updated in DNS database element 54 over some period of time, or on power up and power down of mobile station 12, or upon the occurrence of any suitable action or event. DNS database element 54 may be generally positioned at each respective home server in corresponding sub-networks (enterprise network 34, enterprise network 36, and WAP network 38).

Network registrar 56 manages IP addresses from DHCP server 50 based on the NAIs of end users of one or more mobile stations 12. Network registrar 56 may then securely update the end users DNS entries with the assigned address and possibly other service parameters. Such dynamic DNS capabilities may be based on appropriate procedures, for example, such as suitable RFC2136-compliant processes. Whenever an end user of mobile station 12 is assigned or leased an IP address, the corresponding DNS entry may be updated in DNS database element 54 to reflect the new address along with the corresponding lease information. Periodic refreshes are also enabled in order to permit DNS registrations to expire in the case of lost user connections or mobile station 12 disconnecting service without notification.

Network registrar 56 may assist in automating tasks such as user identity based IP address management and maintenance of such addressing pools. Network registrar 56 may also provide an interface with the directory servers and further facilitate the integration of DNS database element 54 and DHCP server 50 services with other network management applications. Network registrar 56 may also allow DHCP server 50 to read client-provisioning information from DNS database element 54 and to write IP address information dynamically to DNS database element 54.

Home AAA server 60 is a server program that handles end user requests for access to computer resources. For a corresponding network, home AAA 60 also provides authentication, authorization, and accounting services and management. Authorization generally refers to the process of giving an end user permission to do or to access something. In multi-user computer systems, a system administrator may define for the system which end users are allowed access to given locations in the system and further what privileges for an end user are provided. Once an end user has logged into a sub-network, such as enterprise network 34, the sub-network may wish to identify what resources the end user is given during the communication session. Thus, authorization within communication system 10 may be seen as both a preliminary setting up of permissions by a system administrator and the actual checking or verification of the permission values that have been set up when an end user of mobile station 12 is attempting access. Authentication generally refers to the process of determining whether an end user is in fact who or what it is declared to be. In the case of private or public computer networks, authentication may be commonly done, for example, through the use of unique identification elements (such as an NAI) or log-on passwords. Knowledge of the password offers a presumption that the end user is authentic. Accounting generally refers to financial information associated with each end user, or each network, and may additionally include trafficking information or data relating to other information flows within communication system 10 or within a particular sub-network.

IP communications network block 30 may also include a visitor AAA 68. Visitor AAA 68 may be positioned proximate to enterprise networks 34 and 36 or proximate to mobility gateway 20*a* or alternatively positioned in any other suitable location such that IP network 42 may communicate with visitor AAA 68. Visitor AAA 68 is similar to home AAA server 60, but alternatively provides an element for handling end user requests for a visited domain, i.e., a domain outside an end user's home domain. A local element may be in constant communication with visitor AAA 68 such that visitor AAA 68 may route or otherwise proxy information to the home domain (potentially based on the domain information as provided in the end user's NAI).

IP communications network block 30 may additionally comprise a layer to tunneling protocol network server (LNS) 64, which may be provided to address secure services provided to an end user of mobile station 12. In a particular embodiment, LNS 64 offers L2TP secure services within communication system 10. In such a case, a corresponding local access concentrator (LAC) element may be provided in any one or more of mobility gateway elements 20*a* through 20*d* within clusters 18*a* or 18*b*. If an end user travels to a new domain or a visited domain, it may first contact a PDSN element in the visited domain. That PDSN may then communicate, via visitor AAA 68, with home AAA 60 and accordingly authorize the end user. If the end user of mobile station 12 is appropriately authorized, home AAA 60 may then communicate data back to the visited PDSN. The visited PDSN may invoke the LAC element and establish a tunnel to LNS 64 and the end user's home domain. With the appropriate tunneling provided, the information exchange between mobile station 12 and the device or element, which holds the data to be pushed to mobile station 12 may take place through the secure tunneling.

IP communications network block 30 may also include a home agent 70. Home agent 70 may be provisioned in enterprise network 36. However, home agent 70 may alternatively be positioned in any other suitable location where appropriate and according to particular needs. Home agent 70 cooperates with DHCP server 50 during mobile IP registration in order to assign an IP address to mobile station 12. User authentication and IP address allocation may be performed during mobile IP registration with home agent 70 (this is in contrast to the PPP establishment phase for a simple IP service scenario). On authentication, an end user may be assigned an IP address by home agent 70 and network registrar 56. The assigned IP address is returned to the end user with the mobile IP registration reply. The assigned IP address may be a private or a routable IP address. DHCP server 50 may then update DNS database element 54 before returning the IP address and other provisioned parameters to an end user of mobile station 12. A mobile IP tunnel may be established between PDSN cluster 18*a* and home agent 70 via IP network 42 to enable secure end-to-end packet transport.

Where mobile IP services are being offered to an end user, a home network may perform user authentication and IP address allocation. User authentication and IP address allocation are performed during mobile IP registration with home agent 70. Mobile IP enables a host to be identified by a single IP address even while mobile station 12 physically moves its point of attachment from one network to another. This feature allows transparent forwarding of data packets to an end user of mobile station 12. Movement from one point of attachment to another is seamlessly achieved without requiring the intervention of an end user of mobile station 12. Thus, mobile IP servicing in the context of communication system 10 provides ubiquitous connectivity for users irrespective of their presence in their respective home enterprise networks. For end users not capable of mobile IP access, such ubiquitous connectivity may still be achieved by the use of network registrar 56 operating in conjunction with DHCP server 50 and DNS database element 54.

In operation, enterprise network 34 provides for a scenario in which an end user roams into a visited or foreign domain and triggers or otherwise contacts a corresponding server in the visited domain. The visited domain server may then authenticate the end user with the home domain via home AAA 60. After authentication, parameters may be exchanged between the home domain and visited domain. These parameters may set up general data exchanges or secure exchanges where appropriate. LNS 64 is provided to address secure services provided to an end user of mobile station 12. In a particular embodiment, LNS 64 offers L2TP secure services within communication system 10. In such a case, the corresponding LAC element may be provided within clusters 18*a* or 18*b*. Where an end user travels to a new domain or a visited domain, it first contacts the PDSN in the visited domain, which communicates (via visitor AAA 68) with home AAA 60, and authorizes the end user. After the end user is appropriately authorized, home AAA 60 may then communicate data back to the visited PDSN. The visited PDSN may then invoke the LAC element and establish a tunnel to LNS 64 and the end user's home domain. With the appropriate tunneling provided, the information exchange between mobile station 12 and the device or element that holds the data to be pushed to mobile station 12 may take place through the secure tunneling.

Enterprise network 36 represents a sub-network that implements simple IP-type services for an end user of mobile station 12. In the case where a particular home domain offers both mobile IP services and secure services, enterprise network 36 is provided with LNS 64 and home agent 70. Once mobile station 12 is identified, home agent 70 or LNS 64 is invoked. Enterprise network 36 represents a sub-network that generally does not implement mobile IP services nor does it require a specific type of tunneling for secure communications. Thus, enterprise network 36 is similar to enterprise network 34 with a provision for home agent 70 and the elimination of LNS 64.

WAP network 38 may comprise a WAP gateway 74. WAP gateway 74 is a communications interface operable to provide for the exchange of data within WAP network 38. WAP gateway 74 may operate in various network architectures in which gateways provide functions, for example, such as call control, bearer transport, or voice exchange.

In operation of an example flow that illustrates some of the teachings of the present invention, reference is made to FIG. 2. FIG. 2 is a simplified flowchart that outlines one process for providing mobility for mobile station 12. In this example, it is assumed that each cell site element maintains a table of local subscribers connected via the set of base-stations.

At step 100, a selected one of base stations 28 generates a gratuitous ARP. At step 102, a given cell site element, which is connected to an associated base station, listens to the gratuitous ARP from the base station. The cell site element then reviews its table of local subscribers at step 104. If the subscriber is not present in the table, the cell site element generates a mobility registration request at step 106.

The mobility registration request can be generated by using the WiMax micro-mobility protocol (R6/R4), or by using the proxy mobile IP, or by using a wireless LAN context communication protocol (WLCCP) protocol, or any other suitable protocol or mechanism. The mobility registration request contains the VLAN on which the ARP was received and the MAC address of the incoming request. The IP address can also be sent over to the autonomous system number (ASN) gateway or home agent 70. The ASN is a unique number assigned by the InterNIC that identifies an autonomous system in the Internet. ASNs are used by routing protocols (e.g. border gateway protocol (BGP)) to uniquely define an autonomous system.

At step 108, the mobility registration request is received by the ASN gateway or home agent: either of which can authorize the mobility registration request. This authorization policy can be based on a combination of the VLAN and MAC address, or either of these alone. In other embodiments, the policy is based on a network access identifier (NAI). The response may be one of the following: 1) layer-2 switch the specific VLAN; and 2) layer-3 terminate the IP address and add the entry in the mobility-binding table.

In addition to these, other policies can be applied, such as redirection of the users, mapping the user to VPN routing and forwarding (VRF), or another VLAN, or a pseudo-wire can be applied. At step 110, upon receiving the response the cell site element takes the appropriate actions. If the action is to just switch layer-2 traffic for the user, the cell site element enables layer-2 forwarding. If the action is to tag the subscriber as layer-3, the cell site element now adds the subscriber to its visited table, which is similar to a foreign agent function. Other actions, such as mapping to the pseudo-wire, can also be executed. Home agent 70 would add a binding table entry if the end user is a layer-3 subscriber. Home agent 70 sends a revocation to the previous cell site element if there was an existing mobility binding entry.

Communication system 10 now sends layer-3 packets from home agent 70 to the cell site element and does not need a flat layer-2 network. This is reflected by step 112. The cell site element uses the local MAC table and forwards the packets to the appropriate base station.

The NAI used in the proxy mobile IP registration request can include the 6-byte MAC address learned via the gratuitous ARP. The NAI can then be used to authenticate the subscriber. This can then be used to install policies at the home agent or at a proprietary agent (e.g. Cisco's Mobile exchange (CMX)). The VLAN can also be sent as an attribute in the registration procedure. The proxy mobile IP registration response contains the appropriate policies to be applied at the cell site element.

Such a solution can also allow a layer-2 based forwarding operation, which is based on a policy for certain subscribers. This may be required for certain applications, which do not require the layer-3 conversion. Hence, the proposed solution does not rely on a client mobile IP and, therefore, can work much faster in reacting to mobility changes. A client mobile IP solution typically needs to listen to the foreign agent (FA) advertisement, and then the OS stack needs to trigger the MIP registration. In addition, a client based scheme needs management of the end-devices, and has taxing issues working with NAT. Finally, the solution allows migration to an 802.16e based WiMax architecture.

It is important to note that the stages and steps of FIGS. 1 and 2 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention.

Although the present invention has been described in detail with reference to particular embodiments, it should be understood that various other changes, substitutions, and alterations may be made hereto without departing from the spirit and scope of the present invention. For example, although the present invention has been described as operating in PDSN or GGSN environments, the present invention may be used in any networking environment that addresses mobility for mobile station 12. The processing protocol disclosed in the preceding figures is generally applicable to all communication systems in which information packets are routed between or through IP networks. Similarly, although the previous discussion has focused on an IP-based flow, the present invention is applicable to any mobility protocol.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

What is claimed is:
1. A method comprising:
receiving an address resolution protocol (ARP) message from a base station, the ARP message sent in response to a layer 2 link indication from a mobile station;
sending a mobility registration request to request registration for the mobile station;
receiving a response to the mobility registration request, the response indicating an action to facilitate layer 2 network to layer 3 mobility conversion,
wherein an action to facilitate layer 2 network to layer 3 mobility conversion is one of layer 2 switching a specific VLAN, and layer 3 terminating an IP address and adding an entry to a mobility binding table; and
responding to the response by performing the action to facilitate the layer 2 network to layer 3 mobility conversion,
wherein if the action is switching layer 2 traffic, then performing enabling layer 2 forwarding, and if the action is layer 3 terminating an IP address, then performing tagging the mobile station as layer-3 and adding the mobile station to a visited table.
2. The method of claim 1, wherein the mobility registration request is generated by using a WiMax protocol, a proxy mobile IP protocol, a GPRS tunneling protocol (GTP), or a wireless LAN context communication protocol (WLCCP) protocol.

3. The method of claim 1, wherein the mobility registration request identifies a VLAN on which the ARP message was received and a MAC address associated with a request for the selected mobile station.

4. The method of claim 1, further comprising:
authorizing the request.

5. The method of claim 1, further comprising:
authorizing the request based on the VLAN, the MAC address, or a network access identifier (NAI).

6. The method of claim 1, further comprising:
responding to the request by implementing a redirection policy, by mapping the selected mobile station to a VPN routing and forwarding (VRF) element or to a VLAN, or by applying a pseudo-wire.

7. The method of claim 1, further comprising:
responding to the request by communicating layer-3 packets from a home agent to a cell site element associated with the base station.

8. A system comprising:
means for receiving an address resolution protocol (ARP) message from a base station, the ARP message sent in response to a layer 2 link indication from a mobile station;
means for sending a mobility registration request to request registration for the mobile station;
means for receiving a response to the mobility registration request, the response indicating an action to facilitate layer 2 network to layer 3 mobility conversion,
wherein an action to facilitate layer 2 network to layer 3 mobility conversion is one of layer 2 switching a specific VLAN, and layer 3 terminating an IP address and adding an entry to a mobility binding table; and
means for responding to the response by performing the action to facilitate the layer 2 network to layer 3 mobility conversion,
wherein if the action is switching layer 2 traffic, then performing enabling layer 2 forwarding, and if the action is layer 3 terminating an IP address, then performing tagging the mobile station as layer-3 and adding the mobile station to a visited table.

9. The system of claim 8, wherein the mobility registration request is generated by using a WiMax protocol, a proxy mobile IP protocol, a GPRS tunneling protocol (GTP), or a wireless LAN context communication protocol (WLCCP) protocol.

10. The system of claim 8, wherein the mobility registration request identifies a VLAN on which the ARP message was received and a MAC address associated with a request for the selected mobile station.

11. The system of claim 8, further comprising:
means for authorizing the request.

12. The system of claim 8, further comprising:
means for authorizing the request based on the VLAN, the MAC address, or a network access identifier (NAI).

13. The system of claim 8, further comprising:
means for responding to the request by implementing a redirection policy, by mapping the selected mobile station to a VPN routing and forwarding (VRF) element or to a VLAN, or by applying a pseudo-wire.

14. The system of claim 8, further comprising:
means for responding to the request by communicating layer-3 packets from a home agent to a cell site element associated with the base station.

15. A non-transitory computer readable medium storing code for providing mobility in an Internet protocol (IP) network environment, the code when executed is operable to:
receive an address resolution protocol (ARP) message from a base station, the ARP message sent in response to a layer 2 link indication from a mobile station;
send a mobility registration request to request registration for the mobile station;
receive a response to the mobility registration request, the response indicating an action to facilitate layer 2 network to layer 3 mobility conversion,
wherein an action to facilitate layer 2 network to layer 3 mobility conversion is one of layer 2 switching a specific VLAN, and layer 3 terminating an IP address and adding an entry to a mobility binding table; and
respond to the response by performing the action to facilitate the layer 2 network to layer 3 mobility conversion,
wherein if the action is switching layer 2 traffic, then performing enabling layer 2 forwarding, and if the action is layer 3 terminating an IP address, then performing tagging the mobile station as layer-3 and adding the mobile station to a visited table.

16. The medium of claim 15, wherein the mobility registration request is generated by using a WiMax protocol, a GPRS tunneling protocol (GTP), a proxy mobile IP protocol, or a wireless LAN context communication protocol (WLCCP) protocol.

17. The medium of claim 15, wherein the mobility registration request identifies a VLAN on which the ARP message was received and a MAC address associated with a request for the selected mobile station.

18. The medium of claim 15, wherein the code is further operable to:
authorize the request.

19. The medium of claim 15, wherein the code is further operable to:
authorize the request based on the VLAN, the MAC address, or a network access identifier (NAI).

20. An apparatus comprising:
a cell site element operable to:
receive an address resolution protocol (ARP) message from a base station, the ARP message sent in response to a layer 2 link indication from a mobile station;
send a mobility registration request to request registration for the mobile station;
receive a response to the mobility registration request, the response indicating an action to facilitate layer 2 network to layer 3 mobility conversion,
wherein an action to facilitate layer 2 network to layer 3 mobility conversion is one of layer 2 switching a specific VLAN, and layer 3 terminating an IP address and adding an entry to a mobility binding table; and
respond to the response by performing the action to facilitate the layer 2 network to layer 3 mobility conversion,
wherein if the action is switching layer 2 traffic, then performing enabling layer 2 forwarding, and if the action is layer 3 terminating an IP address, then performing tagging the mobile station as layer-3 and adding the mobile station to a visited table.

21. The apparatus of claim 20, wherein the mobility registration request is generated by using a WiMax protocol, a GPRS tunneling protocol (GTP), a proxy mobile IP protocol, or a wireless LAN context communication protocol (WLCCP) protocol.

22. The apparatus of claim 20, wherein the mobility registration request identifies a VLAN on which the ARP message was received and a MAC address associated with a request for the selected mobile station.

23. The apparatus of claim 20, further comprising:
a home agent operable to authorize the request.

24. The apparatus of claim 20, further comprising:
a home agent operable to authorize the request based on the VLAN, the MAC address, or a network access identifier (NAI).

25. The apparatus of claim 20, wherein the cell site element is further operable to respond to the request by implementing a redirection policy, by mapping the selected mobile station to a VPN routing and forwarding (VRF) element or to a VLAN, or by applying a pseudo-wire.

26. The apparatus of claim 20, further comprising:
a home agent, wherein in response to the request layer-3 packets are communicated from the home agent to the cell site element.

* * * * *